United States Patent [19]

Flint

[11] E Re. 30,843

[45] Reissued Jan. 5, 1982

[54] EPOXY TAPE

[76] Inventor: Theodore R. Flint, P.O. Box 513, Valley Forge, Pa. 19481

[21] Appl. No.: 806,923

[22] Filed: Jun. 15, 1977

Related U.S. Patent Documents

Reissue of:

[64] Patent No.: 3,837,981
Issued: Sep. 24, 1974
Appl. No.: 303,146
Filed: Nov. 2, 1972

U.S. Applications:

[63] Continuation-in-part of Ser. No. 141,664, May 10, 1971, Pat. No. 3,708,379.

[51] Int. Cl.[3] ..... B32B 27/38; C09J 3/14; C09J 3/16; C09J 7/02

[52] U.S. Cl. ..... 428/48; 206/219; 156/330; 428/56; 428/58; 428/323; 428/329; 428/343; 428/352; 428/355; 428/373; 428/375; 428/413

[58] Field of Search ..... 156/330, 332; 428/44, 428/48, 56, 58, 323, 327, 329, 343, 352, 355, 373, 375, 413; 206/219

[56] References Cited

U.S. PATENT DOCUMENTS

| | | | |
|---|---|---|---|
| 2,862,616 | 12/1958 | Capozzi | 206/147 |
| 3,087,606 | 4/1963 | Bollmeier | 206/47 |
| 3,317,368 | 5/1967 | Battersby | 428/373 |
| 3,385,744 | 5/1968 | Sciver | 156/330 X |
| 3,395,105 | 7/1968 | Washburn | 156/330 X |
| 3,462,008 | 8/1969 | Tibbs | 206/47 |
| 3,519,250 | 7/1970 | Tibbs | 259/2 |
| 3,578,727 | 5/1971 | Battersby et al. | 260/830 |
| 3,708,379 | 1/1973 | Flint | 428/58 |
| 3,723,223 | 3/1973 | LeCompte | 156/330 X |
| 3,731,791 | 5/1973 | Fourcade | 206/47 A |
| 3,976,530 | 8/1976 | Callan | 156/306 |
| 4,116,742 | 9/1978 | Firth | 156/330 X |

FOREIGN PATENT DOCUMENTS

| | | |
|---|---|---|
| 646446 | 7/1964 | Belgium . |
| 872305 | 6/1971 | Canada . |
| 44-9826 | 5/1969 | Japan . |
| 987059 | 3/1965 | United Kingdom . |
| 1065560 | 4/1967 | United Kingdom . |
| 1072272 | 6/1967 | United Kingdom . |
| 1127913 | 9/1968 | United Kingdom . |
| 1252805 | 11/1971 | United Kingdom . |
| 1277425 | 6/1972 | United Kingdom . |

OTHER PUBLICATIONS

Caverson, B., et al., "Roof Bolts Hold Best with Resin", *J. Soc. of Mining Engineering,* May 1971, pp. 54–57.

Austin, G.: "Sound the Horns: Epoxy Ribbon is Here", article in *Philadelphia Inquirer,* Jul. 20, 1978, p. 3C.

"Repair, Don't Replace" article in *Mechanix Illustrated,* vol. 74, No. 600, May 1978, pp. 120 & 122.

*Primary Examiner*—Dennis L. Albrecht
*Attorney, Agent, or Firm*—Steele, Gould & Fried

[57] ABSTRACT

An epoxy tape useful as an adhesive sealant comprised of a first band of an uncured epoxy resin composition and a second band comprised of a composition capable of curing the epoxy resin. Kneading together of substantially equal lengths of opposed portions of the first and second bands results in an epoxy composition which is self-curing.

10 Claims, 4 Drawing Figures

EPOXY TAPE

Matter enclosed in heavy brackets [ ] appears in the original patent but forms no part of this reissue specification; matter printed in italics indicates the additions made by reissue.

BACKGROUND OF THE INVENTION

This application is a continuation-in-part application of my copending application Ser. No. 141,664, filed May 10, 1971, for an Elastomeric Tape, now U.S. Pat. No. 3,708,379.

Various epoxy resin compositions useful as adhesive sealants are available commercially. These compositions generally comprise uncured epoxy resins together with curing agents therefor. Curing is effected by the addition of the curing agent to the epoxy resin.

Since the epoxy resin and curing agent cannot be combined prior to the time of use, otherwise premature curing occurs, it is customary to supply the epoxy resin in a package separate from that of the curing agent. In use, the contents of the two packages, frequently tube-like containers, or portions thereof, are combined to provide a self-curing epoxy resin composition. Such systems are undesirable from the standpoint of packaging costs and ease of use. In addition, the customer is required to follow specific mixing instructions if he is to obtain satisfactory adhesive sealants.

It is the object of this invention to provide a room temperature, self-curing epoxy resin composition in tape form. A further object of this invention is to provide a room temperature self-curing epoxy resin useful as an adhesive sealant in tape form. Another object of this invention is to provide an epoxy resin composition containing both an epoxy resin and a curing system therefor which requires no special packaging or storing conditions, yet remains in a stable, uncured state for an indefinite period of time and is readily curable by simple mixing by either hand or machine to form an epoxy adhesive sealant having useful chemical and physical properties. Yet another object of this invention is to provide an epoxy composition in tape form such that any portion thereof contains the proper proportion of epoxy resin and curing agent therefor.

DETAILED DESCRIPTION OF THE INVENTION

According to this invention, the above-described objects and advantages are obtained by preparing an epoxy tape comprising a first band of an uncured epoxy resin composition and a second band, said bands being joined in close side-by-side relation throughout their entire lengths, said second band comprising a composition capable of curing said epoxy resin in said first band when said first and second bands are combined to form a substantially uniform mixture.

In the appended drawings, FIGS. 1 through 4 are plan views illustrating various embodiments of the epoxy tape of this invention. The various embodiments illustrated in the drawings are discussed in further detail hereinafter.

The epoxy tape of this invention has two principal components, viz., an uncured epoxy resin and a curing system for the epoxy resin. The epoxy resins which may be employed are complex polymeric reaction products of polyhydric phenols with polyfunctional halohydrins. Such resins are available commercially and are typically the product of a reaction between epichlorohydrin and 2,2-bis(p-hydroxyphenol) propane (Bisphenol A). By adjusting the ratio of Bisphenol A to epichlorohydrin, epoxy resins of different physical properties are obtained. For example, resins made with a low Bisphenol A to epichlorohydrin ratio generally are characterized by a high viscosity.

Epoxy resins are also characterized by their oxirane oxygen content and their epoxy equivalent weight, the epoxy equivalent weight being the molecular weight of the resin divided by the mean number of oxirane oxygen rings per molecule. The epoxy resin compositions utilized to prepare the adhesive sealants of the present invention include semisolid epoxy resins, solid epoxy resins, liquid epoxy resins and mixtures of the above resins in proportions such that when admixed with suitable fillers, pigments and the like, a putty-like composition which can be extruded into tape form is prepared.

The curing system for the uncured epoxy resin will generally comprise any of the well known curing agents for epoxy resins such as a resinous polyamide composition. As will be discussed in more detail hereinafter, specific curing agents utilized in a given epoxy tape composition will depend primarily on the specific epoxy resin utilized in forming the tape and to a lesser extent on the rate and degree of curing desired for the epoxy tape. Thus, the resinous polyamide utilized as a curing agent for the epoxy resin may be selected from the group consisting of a single polyamide, or a blend of two or more polyamides. Polyamide resins are condensation products of polymerized fatty acids with polyalkyl polyamines prepared according to procedures well know in the art.

In addition to the uncured epoxy and the curing system components, the epoxy tape may contain a variety of conventional and special purpose ingredients. Thus, the uncured epoxy and curing system components may be combined with various fillers, plasticizers, colorants and the like to provide compositions having the physical properties required for forming a tape.

The fillers and other components must be selected and combined with the epoxy resin or curing agent in such a manner as to provide compositions which can be formed into the desired tape by extrusion. To accomplish this, the material making up each band of the tape is formulated into a "putty-like" composition, and the respective compositions are simultaneously extruded in side-by-side relationship to produce a length of tape. Moreover, the tape should be so formulated that little, if any, migration or interaction occurs between the curing system component in one band of the tape and the epoxy resin in the other band. That is, the epoxy tape is formulated so that the epoxy resin and the curing system components therefor are contained in separate bands making up the tape in such a manner that the epoxy resin itself will not cure until substantially equal lengths of the respective bands are combined into a substantially uniform mixture, after which curing proceeds as in conventional epoxy compositions.

Considering the invention in greater detail in connection with the drawings, it is noted that the epoxy tape may be prepared in various forms.

Figure 3:
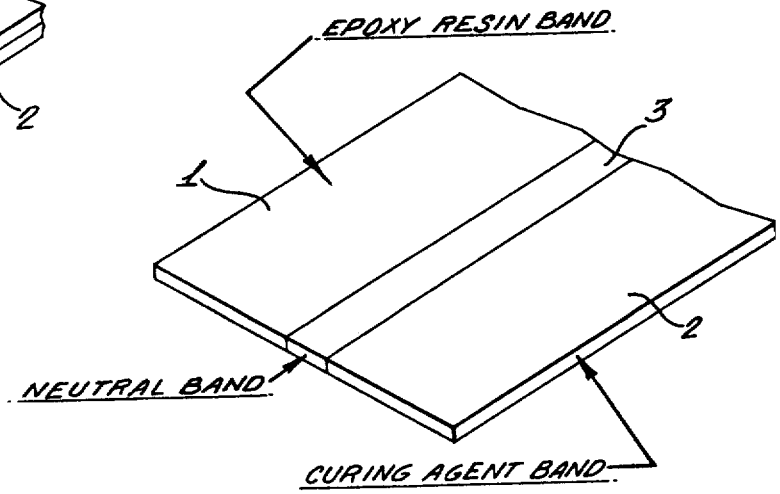

FIG. 3 illustrates an epoxy tape in which band 1 of the tape contains the epoxy resin composition while band 2 of the tape contains a curing agent for the epoxy resin. Between bands 1 and 2 is band 3, a neutral band which does not contain either the epoxy resin or a curing agent therefor but rather is a band of the various non-reactive components including plasticizers and fillers which may be useful in forming the epoxy tape, the three bands being in side-by-side relationship throughout their lengths with band 3 acting as a physical barrier between bands 1 and 2.

Figure 4:
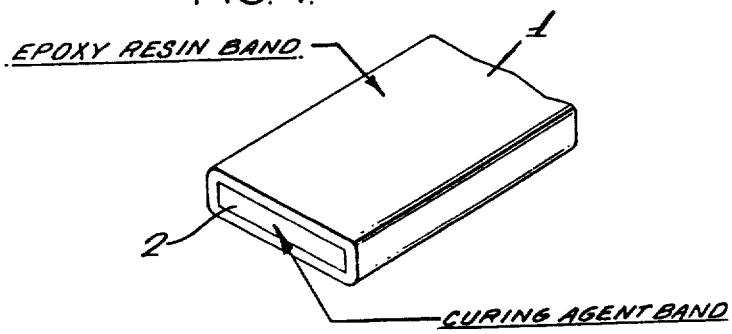

FIG. 4 illustrates another form in which the tape of this invention may be constructed. In this embodiment, for example, band 1 contains an epoxy resin while band 2 contains a curing agent for the epoxy resin much in the same manner as described for the tapes illustrated in FIGS. 1 through 3 above. It is desirable to prepare tapes in the form shown in FIG. 4 when one of the materials making up a band of the tape is not stable on contact with air or does not have sufficient cohesiveness to be self-supporting.

Figure 1:
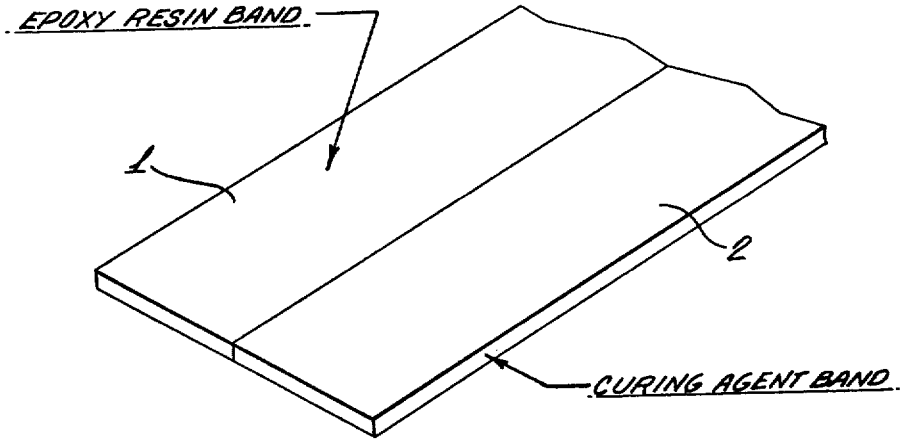
FIG. 1 illustrates an epoxy tape in which band 1 contains the epoxy resin composition and band 2 contains a polyamide resin composition capable of curing said epoxy resin.

To prepare the elastomeric tape illustrated in FIG. 1, two separate putty-like masses are formed, one containing the epoxy resin admixed with fillers, plasticizers, colorants and the like and the other containing a curing system for the epoxy resin also admixed with fillers, plasticizers, colorants and the like. Each putty-like mass is then extruded through a co-extrusion die to form the desired tape. Epoxy resins desirable for use in the present invention include solid epoxy resins having an epoxy equivalent weight of about 385 to about 500 and a melting point of from about 60 to 75° C.; liquid epoxy resins having an epoxy equivalent weight ranging from about 185 to about 200 and a viscosity ranging from about 120 to about 160 poises at 25° C.; and semisolid epoxy resins having an epoxy equivalent weight ranging from about 650 to about 750 and a kinematic viscosity (viscosity of a solution containing 75%, by weight, of the epoxy resin in xylene), of 15 to 25 poises at 25° C. Mixtures of said resins having a kinematic viscosity ranging from about 0.01 to about 10 poises at 25° C. such as are formed when from about 50 parts to about 300 parts of a solid epoxy resin such as that described above are combined with about 100 parts of a liquid epoxy resin such as that defined above, may also be utilized.

A desirable curing system for the epoxy resin comprises a semisolid resinous polyamide having a viscosity of about 5 to about 80, preferably about 10 poises at 150° C. and an amine value ranging from 85 to 95. Resins of this type are available commercially as Versamid® of General Mills. Mixtures of this polyamide resin with lower viscosity and more reactive resins such as those having a viscosity of about 5 to about 100; preferably about 35 poises at 75° C. and an amine value ranging from about 230 to about 380 may also be utilized. Resins of this type are also available commercially under the trademark Versamid from General Mills. In general, a blend of polyamide resins utilized in the tape of the invention should have an amine value ranging from 90 to 375 and a viscosity of 5 to 80 poises at 150° C.

To accomplish satisfactory curing of the epoxy resin, there should be a sufficient amount of the curing agent in the curing system to crosslink at least about 70 to about 150% preferably about 100% of the available crosslinking sites in the epoxy resin in the tape. Curing to this extent can be achieved with the use of from about 40 to about 150 preferably about 100 parts of a polyamide curing agent per 100 parts of epoxy resin in the tape.

The epoxy resin and the polyamide resin curing agents therefor are admixed with various fillers, colorants and plasticizers to form the respective putty-like compositions which are extruded into the epoxy tape of this invention. Useful fillers include talc, powdered alumina and asbestos fiber. Fillers such as these provide the epoxy resin and the polyamide resin compositions with the physical properties necessary for extrusion into tape form and also enhance the properties of the cured system. The fillers are incorporated into the epoxy resin and polyamide resin compositions in amounts sufficient to produce a putty-like mass which can be easily extruded into the desired epoxy tape. Finely powdered talc such as Mistron Vapor® of the United Sierra Division of Cypress Mines Corporation is an especially preferred filler, since it yields a handleable putty-like mass with both epoxy resins and polyamide resins. The putty-like masses compared with this filler show less tendency to stick to the hands than do putty-like masses compared with other fillers. Plasticizers include resinous polyols and other agents which serve to soften the cured epoxy tape.

Colorants may be included in the epoxy or curing agent compositions as desired. Useful colorants include pigments like titanium dioxide which provides a white color; carbon black for black color and various organic and inorganic pigments for other colors. It is desirable that the respective bands of the epoxy tape be of contrasting color to facilitate use of the epoxy tape.

In use, a portion of the tape comprising substantially equal lengths of each band of the tape is selected and the bands are mixed together, e.g. by hand. The mixing permits the components of the polyamide curing system to react with the epoxy resin composition effecting curing, in situ. When the bands of the tape are of contrasting color, it is easy to determine when a uniform mixture has been obtained simply by continuing mixing until the mixture has a uniform color. It will be appreciated that pigment may be included in one or both bands of the elastomeric tape.

Figure 2:
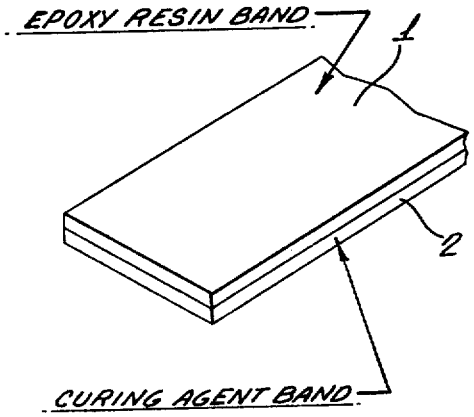
FIG. 2 illustrates an epoxy tape in which the composition of the respective bands is that described with respect to FIG. 1, however, the bands of tape are superimposed in their greater dimension one on the other throughout their length.

The epoxy tapes illustrated in FIGS. 1 and 2 may be prepared in the following manner. The composition comprising each band of the tape is prepared separately by mixing together of the constituents, and the separate mixtures are extruded through a co-extrusion die. In preparing the epoxy and polyamide compositions for extrusion, the dry ingredients are combined with the liquid or liquified epoxy or polyamide resins to form highly viscous, smooth, putty-like masses. The separate compositions are then formed into cylindrical slugs which can be introduced to a suitable extruder. The compositions forming the respective bands are extruded from twin extruders arranged at right angles to one another and the extrudates are then co-extruded through a die which simultaneously lays down the respective bands in side-by-side relationship to form a tape. The tape is generally extruded onto a moving strip of a release paper such as parchment paper or silicone release paper. The release paper moves at a constant rate on an endless belt and is controlled so that the extruded tape is not pulled or allowed to buckle. The bands of the material being extruded through the co-extrusion die may have different rheological properties at any given temperature, which causes the materials to pass through the die at different rates. To alleviate the problem and to insure that the bands are extruded at substantially the same rate, the material which extrudes more slowly should be maintained at a higher temperature than that of the other extrudate. During the extrusion process, the temperature of both compositions should not exceed about 150° F., otherwise premature curing of the epoxy at the interface between the bands may result.

To prepare the tape illustrated in FIG. 3, the constituents of each band are prepared as described above; however, that are, of course, three separate putty-like compositions for the extrusion process. The compositions forming the three bands are extruded from three extruders leading to a single tri-extrusion die which simultaneously lays down three bands in side-by-side relationship to form the tape of FIG. 3.

After extrusion, any desired length of the tape may be simply rolled up and packaged in any desired manner. There is no need for special packaging requirements to give a useful shelf life to the tape.

In use, any desired quantity of the epoxy tape made up to equal lengths of each band in the tape are selected and kneaded together under ambient conditions forming a uniform mixture. The resulting dough-like epoxy material has a useable pot life of approximately 4 hours and will fully cure to a useful tough, solid epoxy adhesive in about 24 hours. The epoxy resin formed from the epoxy tape of this invention has excellent adhesive sealant properties and may be utilized to adhere ceramic, wood and metal and like materials, to aluminum, concrete, steel, ceramic and like substrates. The epoxy composition will cure at ambient temperature; however, curing will be accelerated at elevated temperatures. For example, the epoxy composition will cure completely in about one hour's time if heated to a temperature of about 200° F. Moreover, the epoxy composition will cure underwater making it useful in many marine environments.

It is known that electrically conductive carbon black may be incorporated into various substances to increase the electrical conductivity thereof. The epoxy tape of this invention may include electrically conductive carbon black such as Vulcan X-C 72 from Cabot Corporation in amounts sufficient to impart at least semiconductive properties to the cured epoxy composition formed from the tape. This may be accomplished by incorporating a total of about 30%, by weight, based on the weight of the epoxy tape of electrically conductive carbon black in the tape. The electrically conductive carbon black may be incorporated in one, or both, bands of the epoxy tape in any proportion. Even more highly conductive epoxy compositions can be formulated by incorporating about 40%, by weight, based on the weight of the epoxy tape, of finely-divided silver powder in the epoxy tape.

The following examples are set forth as illustrative of the present invention:

EXAMPLE 1

19 parts of a liquid epoxy resin having an epoxy equivalent weight of 185 to 196 and a viscosity of 120 to 160 poises at 25° C. is combined with 27 parts of a solid epoxy resin having an epoxy equivalent weight of 385 to 500 and a melting point of 60° to 75° C. in a steam jacketed, double arm, sigma blade mixer. The resins are mixed until a uniform viscous solution is achieved and 44 parts of powdered talc, (Mistron Vapor ® by United Sierra Division of Cypress Mines Corporation) is added and mixed slowly with constant agitation forming a highly viscous, smooth material. During this mixing procedure, the mixture should be cooled so that the temperature of the mass does not exceed 120° F. A second mixture is prepared by mixing 57 parts of a semisolid polyamide resin having an amine value of 90 and a viscosity of 10 poises at 150° C., (Versamid ® 100 of General Mills) with 43 parts of powdered talc, (Mistron Vapor ®), in a sigma blade mixer maintained at a temperature not exceeding 120° F. until a uniform mixture is formed.

Equal portions, by weight, of each mixture are formed into slugs and fed separately into twin extruders positioned at right angles to one another, the extruders feeding each mass into a co-extrusion die which simultaneously lays down a band of each mixture in side-by-side relationship onto a moving strip of parchment release paper (Patapar ® 40 of Paterson Parchment Company). The release paper moves over an endless belt at a constant rate so that the extruded bands are not pulled or allowed to buckle. To insure the bands are extruded at substantially the same rate, the material which extrudes more slowly is maintained at a higher temperature than that of the other, however, in no event should the temperature of either mixture exceed 150° F.

As the bands of each material are laid down in side-by-side relationship a tape is formed which is rolled into any convenient length and packaged as any conventional tape. To utilize the tape, any length thereof is removed from the roll, separated from the release paper and kneaded by hand or machine until a uniformly colored mixture is obtained. The mixture may be utilized as a metal to metal adhesive sealant which when allowed to stand while curing occurs forms a tough, hard adhesive seal.

EXAMPLE 2

Following the procedure and utilizing the apparatus described in Example 1, two separate mixtures are prepared as follows: 100 parts of a semisolid epoxy resin (Epon ® 872 from Shell Chemical Company), having an epoxy equivalent weight of 650 to 750 and kinematic viscosity of 15 to 25 poises at 25° C. is mixed with 80 parts of talc (Mistron Vapor ®), forming the first mixture. A second mixture is prepared by combining 38 parts of semisolid polyamide resin having an amine value of 90 and a viscosity of 10 poises at 150° C. (Versamid ® 100) with 38 parts of a semisolid polyamide resin having an amine value of 238 and a viscosity of 35 poises at 75° C. (Versamid ® 115) and 38 parts of talc (Mistron Vapor ®).

These two mixtures are formed into slugs and extruded through a co-extrusion die so that the bands formed from the material are laid down in side-by-side relation. As the bands of each material are laid down in side-by-side relation, a tape is formed which is rolled to any convenient length and packaged as any conventional tape. This tape is utilized in the same manner as the tape of Example 1; however, it cures more rapidly.

EXAMPLE 3

Following the procedure and utilizing the apparatus described in Example 1, two separate mixtures are prepared as follows:

27 parts of a liquid epoxy resin having an epoxy equivalent weight of 185 to 196 and a viscosity of 120 to 160 poises at 25° C. (Araldite® 6010 of Ciba), and 19 parts of a solid epoxy resin having an epoxy equivalent weight of 385 to 500 and a melting point of 60 to 75° C. (Araldite® 6060) are mixed and blended together forming a uniform mixture. 40 parts of powdered alumina and 14.5 parts of short fiber asbestos such as Canadian asbestos 7R10 of the Phillip Carey Company are mixed forming a uniform putty-like material.

A second mixture is prepared by combining 57 parts of a semisolid polyamide resin having an amine value of 90 and a viscosity of 10 poises at 150° F. (Versamid® 100), with 19 parts of asbestos fiber in a sigma blade mixer heated to a temperature of 180° F. After a uniform mixture is obtained, no further heating of the mixture occurs, and 8 parts of powdered talc (Mistron Vapor®), is added with continuous mixing. 16 parts of titanium dioxide powder (Zopaque® R69 of SCM Corporation), is dispersed in this mixture and blended until a uniform mixture is formed. The two mixtures are then extruded through a co-extrusion die and laid down in side-by-side relation on release paper in the manner described in Example 1 above. This tape has the properties and is utilized in the same manner as the tape of Example 1.

Having thus described the invention, what is claimed is:

1. An epoxy tape comprising a first band of of an uncured epoxy resin composition and a second band, said bands being joined in close side-by-side relation throughout their entire length, said second band comprising a composition capable of curing of said epoxy resin in said tape when said first and second bands are combined to form a substantially uniform mixture *whereby said tape may be mixed by kneading and may be cured at ambient temperature, at elevated tempertures, and under water and remains in a stable uncured state in absence of kneading.*

2. An epoxy tape according to claim 1 wherein said epoxy resin has an epoxy equivalent weight of about 650 to 750 and a kinematic viscosity of 15 to 25 poises at 25° C. and said curing agent for said epoxy resin is a blend of polyamide resins having an amine value of 90 to 375 and a viscosity of 5 to 80 poises at 150° C.

3. An epoxy tape according to claim 2 wherein said epoxy resin is a blend of a solid epoxy resin with a liquid epoxy resin said blend having a kinematic viscosity of 0.01 to 10 poises at 25° C.

4. An epoxy tape according to claim 2 wherein said epoxy resin and said polyamide resin are admixed with fillers and colorants selected from the group consisting of talc, alumina, asbestos fiber, titanium dioxide, carbon black and mixtures thereof forming an extrudable composition.

5. An epoxy tape according to claim 4 wherein said epoxy tape also includes about 30% to 40%, by weight, based on the weight of said tape of an electrically conductive substance selected from the group consisting of electrically conductive carbon black and silver powder.

*6. A kneadable epoxy tape according to claim 1 wherein said first and second bands are of different color and visually distinct one from the other, so that substantially complete mixing of the material of one band with that of the other to form a substantially uniform mixture can be detected visually by formation of a substantially uniform color.*

7. A kneadable epoxy tape according to claim 1 wherein said first and second bands are self supporting and characterized in that substantially equal portions of said first and second bands can be removed from the tape and kneaded together forming a curable epoxy resin product.

*8. A kneadable epoxy tape according to claim 1 wherein said first and second bands remain in a stable and uncured state in absence of removing portions of said bands from the epoxy tape and kneading said removed portions of said bands to form a curable epoxy resin product.*

*9. A kneadable epoxy tape according to claim 1 wherein said second band contains a sufficient amount of curing agent to crosslink about 70 to about 150 percent of the available crosslinking sites in the epoxy resin in said first band of the epoxy tape.*

*10. A kneadable epoxy tape according to claim wherein said first and second bands are simultaneously extruded in side-by-side relationship.*

* * * * *

UNITED STATES PATENT AND TRADEMARK OFFICE

CERTIFICATE OF CORRECTION

PATENT NO. : Re. 30,843

DATED : January 5, 1982

INVENTOR(S) : Theodore R. Flint

It is certified that error appears in the above-identified patent and that said Letters Patent are hereby corrected as shown below:

Col. 5, l. 14, "that" should be - - there - -

Col. 7, l. 30, delete "of" (second occurrence)

Col. 8, ls. 26-31 All of Claim 7 should be in italics

Signed and Sealed this

*Seventh* Day of *September 1982*

[SEAL]

*Attest:*

GERALD J. MOSSINGHOFF

*Attesting Officer* *Commissioner of Patents and Trademarks*